UNITED STATES PATENT OFFICE.

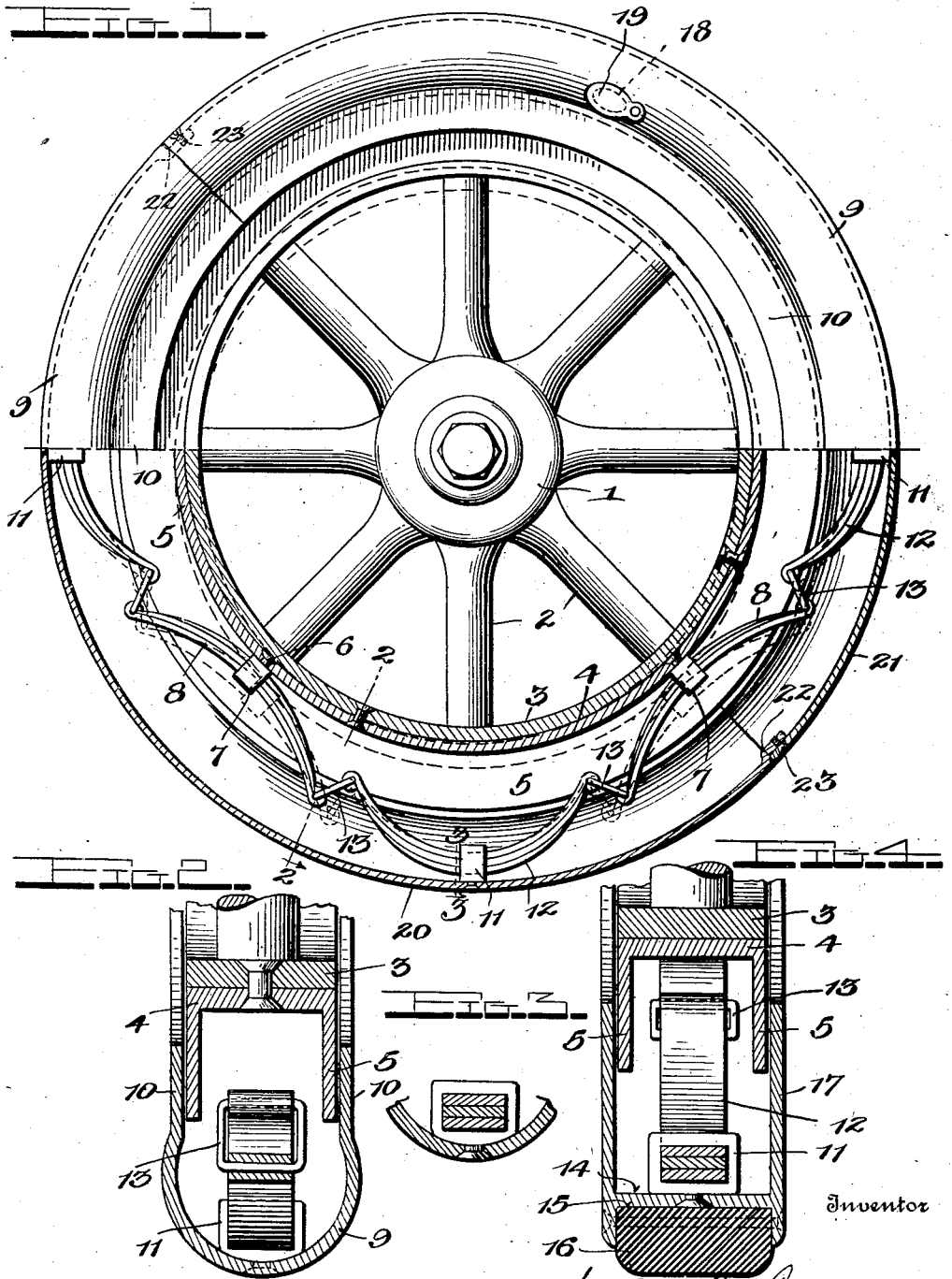

HENRY J. LA BAUVE, OF AUSTIN, TEXAS.

COMBINED AUTOMOBILE-WHEEL AND FLEXIBLE TIRE.

1,269,613.  Specification of Letters Patent.  Patented June 18, 1918.

Application filed March 16, 1914. Serial No. 825,174.

*To all whom it may concern:*

Be it known that I, HENRY JOHN LA BAUVE, a citizen of the United States, residing at Austin, in the county of Travis and State of Texas, have invented certain new and useful Improvements in a Combined Automobile-Wheel and Flexible Tire.

The present invention is directed to improvements in resilient wheels, and has for its object to provide a device of the character especially adapted for use in connection with motor vehicles.

A further object of the invention is to provide a wheel with a yieldably connected tire so as to take up the vibration upon the vehicle equipped with the wheel.

A still further object of the invention is to provide a vehicle wheel with a yieldable rim in lieu of a pneumatic tire, but at the same time imparting to the vehicle the resiliency characteristic of a wheel equipped with a pneumatic tire.

A still further object of the invention is to provide a yieldable rim for a wheel formed from sheet metal as a substitute for the usual pneumatic tire, thereby eliminating the expense of repairs incident to punctures and blow-outs.

In the drawings:

Figure 1 is a side elevation of a wheel, partly in section;

Fig. 2 is a sectional view on the line 2—2 of Fig. 1;

Fig. 3 is a sectional view on the line 3—3 of Fig. 1; and

Fig. 4 is a sectional view of a slightly modified form of tire.

Referring to the drawing, the numeral 1 designates the hub of the wheel, and 2 the spokes radiating therefrom, and to which is secured the rim 3.

Tightly riveted to the rim 3 is a band 4, having spaced peripheral vertical flanges 5, the purpose of which will appear later.

Secured to the band 3 by rivets 6 are clips 7, each clip being adapted to engage the central portions of the outwardly bowed springs 8.

The outer rim 9 is formed from suitable sheet metal and is curved in cross section, as shown clearly in Fig. 2, a rounded tread being produced, thus adding to the appearance of the wheel.

The sides of the outer rim terminate in circular plates 10, which telescopically engage the flanges 5 of said band, whereby relative movement of the plates 10 and flanges 5 is permitted during travel of the wheel.

Fixed interiorly of the outer rim 9 are clips 11 said clips being constructed similar to the clips 7 hereinbefore mentioned, said clips serving to secure the inwardly bowed springs 12 properly positioned in respect to the springs 8. The springs 12 are of the same character as the springs 8.

The springs 8 and 12 are so arranged that their ends are disposed adjacent each other, and are pivotally connected by links 13.

The ends of the springs 8 are closer to the tread of the tire than the ends of the springs 12 when the wheel is supporting a vehicle, the weight thereof naturally moving the band 4 downwardly and with it the springs 8, whereupon said springs and the springs 12 tend to straighten out, thus successively swinging the links 13 downwardly during travel of the wheel so that the parts assume the position as shown in dotted lines in Fig. 1. This permits free movement of the springs, and eliminates the likelihood of the ends of the same coming in contact with each other, should the wheel be subjected to an unusual jar. Thus it will be seen that when the wheel is in motion that the weight of the vehicle causes the springs 8 and 12 to successively straighten out, and since the ends of the springs 8 are spaced from and below the ends of the springs 12, the adjacent ends of the springs will move in opposite directions. From the foregoing it will be seen that this structure provides a free space between the entire concave faces of both sets of springs and the opposite rims, whereby the springs may bodily and freely and unobstructedly move in said free space.

In Fig. 4, the outer rim 14 is formed with a circumferential groove 15, in which is mounted a cushion tread 16. The outer rim 14 is H-shaped in cross section so as to provide circular side plates 17, which telescopically receive the flanges 5 of the rim 4. The flanges 5 not only serve in conjunction with the plates 10 and 17 to slidably connect the wheel and rim, but prevent independent lateral movement thereof.

The outer rim 9 may be provided with openings 18 through which lubricant may be introduced to the interior thereof said opening being normally closed by a swinging closure 19.

The tire is formed of two sections 20 and 21 connected by the overlapping joints 22, the latter being secured by fastenings 23.

What is claimed is:

In a resilient tire, an inner rim, a series of inner spaced bowed springs secured thereto, an outer rim, a series of outer spaced bowed springs secured to the outer rim, the adjacent ends of adjacent inner and outer springs having spaces therebetween which intervene between said adjacent springs, and means crossing the said intervening spaces and connected to the adjacent ends of adjacent springs, the ends of the inner springs projecting beyond the outer sides of the adjacent ends of the outer springs so as to be disposed between the ends of the outer springs and the tread of the outer rim and there being free space between the entire concave faces of both sets of springs and the opposite rims, whereby the inner springs may bodily and freely and unobstructedly move in said free space toward the inner circumferential face of the outer rim and the outer springs may also bodily and freely and unobstructedly move in said free space toward the periphery of the inner rim.

H. J. LA BAUVE.

Witnesses:
C. EDWIN LA BAUVE,
JOE KOEN.

Copies of this patent may be obtained for five cents each, by addressing the "Commissioner of Patents, Washington, D. C."